US010520200B1

(12) United States Patent
Straubel

(10) Patent No.: US 10,520,200 B1
(45) Date of Patent: Dec. 31, 2019

(54) MULTI-FUEL GRILL APPARATUS

(71) Applicant: Jeffrey Neil Straubel, Santa Ana, CA (US)

(72) Inventor: Jeffrey Neil Straubel, Santa Ana, CA (US)

(73) Assignee: AMD Direct, Inc., Huntington Beach, CA (US)

( * ) Notice: Subject to any disclaimer, the term of this patent is extended or adjusted under 35 U.S.C. 154(b) by 418 days.

(21) Appl. No.: 15/409,007

(22) Filed: Jan. 18, 2017

Related U.S. Application Data

(60) Provisional application No. 62/281,182, filed on Jan. 20, 2016.

(51) Int. Cl.
*A47J 37/00* (2006.01)
*F24C 11/00* (2006.01)
*F24B 3/00* (2006.01)
*F24B 13/02* (2006.01)

(52) U.S. Cl.
CPC ............... *F24C 11/00* (2013.01); *F24B 3/00* (2013.01); *F24B 13/02* (2013.01)

(58) Field of Classification Search
CPC ...................... A47J 37/0713; Y02A 40/928
USPC ............. 126/25 R, 29, 30, 27, 28, 26, 25 A, 126/25 AA, 25 B, 25 C
See application file for complete search history.

(56) References Cited

U.S. PATENT DOCUMENTS

| | | | |
|---|---|---|---|
| 2009/0178666 A1 | 7/2009 | Cagle et al. | |
| 2010/0218691 A1* | 9/2010 | Adams | A23B 4/044 99/482 |
| 2011/0219958 A1* | 9/2011 | Noble | A23B 4/044 99/473 |
| 2012/0234308 A1 | 9/2012 | Faulk et al. | |
| 2012/0266856 A1* | 10/2012 | Zelek | A47J 37/067 126/25 R |
| 2013/0213243 A1* | 8/2013 | Borovicka | A47J 37/0786 99/482 |

* cited by examiner

*Primary Examiner* — Vivek K Shirsat
(74) *Attorney, Agent, or Firm* — Lodestone Legal Group; Jeromye V. Sartain

(57) ABSTRACT

A multi-fuel grill apparatus comprising a burner, a burner cover positioned over and spaced from the burner, a solid fuel tray and/or a firebox basin. The burner cover may comprise a lower flame deflector having opposite, downwardly-extending first angled walls linked at a substantially centered cover angled wall joint and/or an upper debris deflector having a top wall and opposite, downwardly-extending deflector angled walls. The solid fuel tray may comprise opposite tray angled side walls configured to seat on the deflector angled walls so as to selectively suspend the tray between two burner covers. The firebox basin may have an upwardly-extending protrusion having opposite basin angled walls linked at a basin angled wall joint substantially vertically aligned with one or more of the burner and the cover angled wall joint. A vent may be formed in the front panel of the grill body adjacent to one or more controls for communicating with the firebox basin.

21 Claims, 6 Drawing Sheets

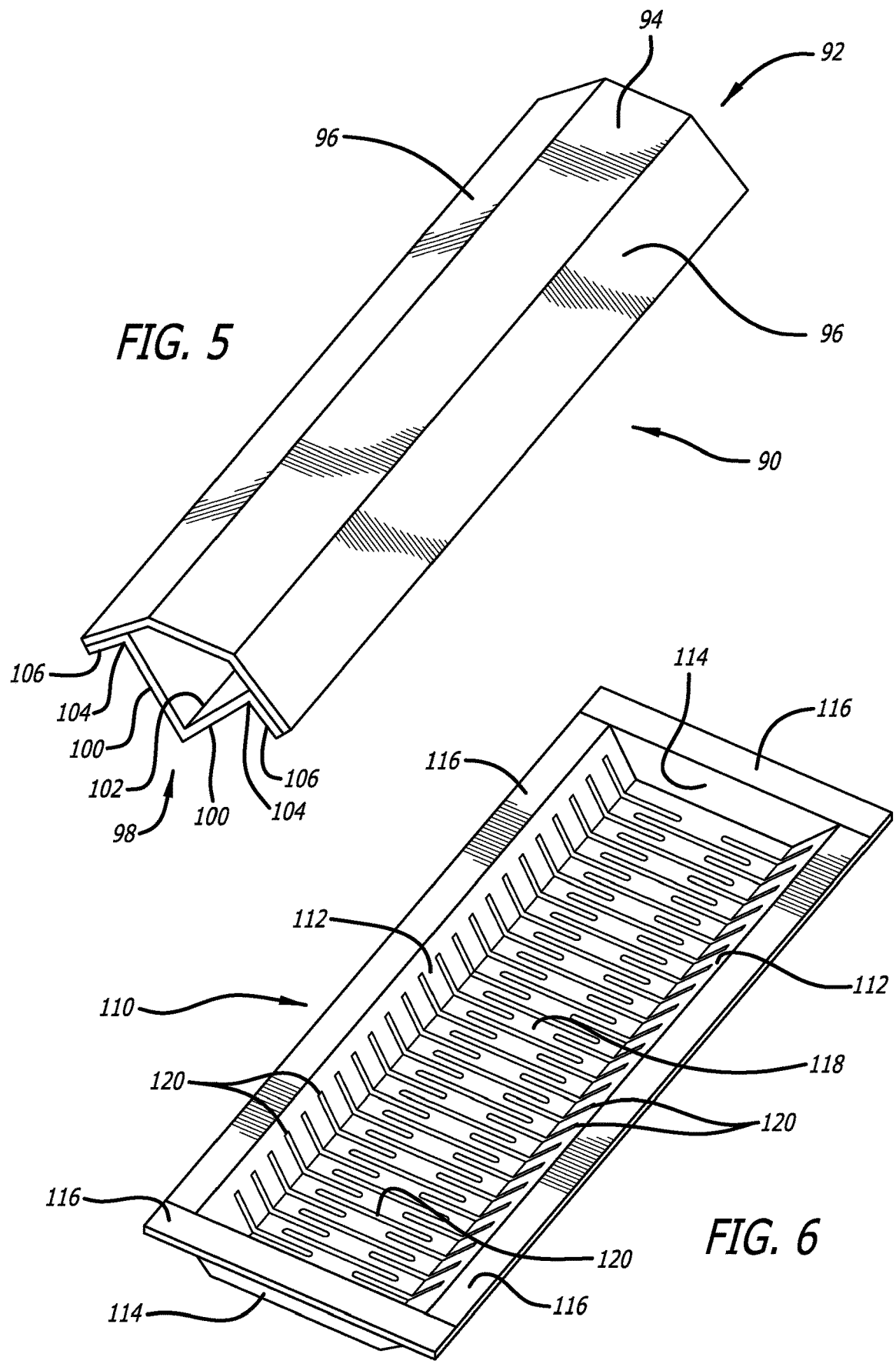

MULTI-FUEL GRILL APPARATUS

RELATED APPLICATIONS

This non-provisional patent application claims priority pursuant to 35 U.S.C. § 119(e) to and is entitled to the filing date of U.S. Provisional Patent Application Ser. No. 62/281,182 filed Jan. 20, 2016, and entitled "Multi-Fuel Grill Apparatus." The contents of the aforementioned application is incorporated herein by reference.

BACKGROUND

The subject of this provisional patent application relates generally to grills for cooking, and more particularly to such grills configured to operate on or utilize multiple different fuels.

Applicant(s) hereby incorporate herein by reference any and all patents and published patent applications cited or referred to in this application.

By way of background, cooking food by grilling is a common practice using a variety of tools, utensils, appliances, and the like, whether indoor or outdoor. Any such grill on which food is cooked, at a high level, generally comprises a cooking surface, such as a grate, griddle, or other such surface on which the food is typically directly placed and some source of heat beneath the cooking surface.

In most grilling applications, the source of heat for cooking whatever food item is placed on the cooking surface falls into one of two general categories: (1) solid fuels; and (2) liquid fuels. Or, as more commonly referred, there is the more traditional "charcoal grill" and the more recent "gas grill," respectively. A "charcoal grill" is actually but one example of a grill that heats based on ignition or burning of a "solid fuel," with wood and other combustible or flammable substances also fitting within this category; sometimes a variety of solid fuels are employed together for flavoring, smoking, or other desired effects, such as adding hickory chips to a charcoal fire. In the category of "liquid fuel" grills, this would include propane and other such grills that are commonly equipped with one or more burners having a supply line for connection to a liquid fuel tank (i.e., "propane tank") and related controls for metering the liquid fuel to the burner and thus controlling the heat produced or cooking temperature. As referred to throughout, a "liquid fuel" is to be understood as both liquid and gaseous fuels or as any combustible substances that are not solid and are thus able to flow, irrespective of whether such "liquid fuel" happens to be in liquid or gaseous form or state at a particular temperature or pressure and other factors.

For reasons of convenience, such as ease of starting the grill or fire and less messy use and clean up, and of more accurate control of cooking temperature, as well as other accessories such as additional burners for boiling or simmering, gas grills, or grills that operate on a liquid fuel source, have become quite popular in recent years. However, at least one tradeoff is the perceived downside of gas grills not providing as much flavor to the food as compared to food cooked over an open flame based on "solid fuels" such as charcoal and wood that can add a variety of smoky flavors to the cooked food.

Accordingly, efforts have been made to overcome the deficiencies of both gas and charcoal grills, or grills that operate on either liquid or solid fuel, by finding ways to combine both fuel sources in a single grill so as to effectively get "the best of both worlds." One such multi-fuel grill proposed by inventors Faulk and Thomas as set forth in U.S. Patent Application Publication No. 2012/0234308 dated Sep. 20, 2012 is directed to a grill system that includes a grill frame and a cooking surface attached to the grill frame. The grill system also includes a solid fuel compartment positioned proximate to the cooking surface. The grill system additionally includes a burner positioned below the solid fuel compartment. Cooking may be accomplished by alternately using only the burner, using only solid fuel placed in the solid fuel compartment, and using both the burner and the solid fuel placed in the solid fuel compartment to heat a common area of the cooking surface without modifying an arrangement of the solid fuel compartment and the burner.

What is still needed and has heretofore been unavailable is a more effective and simplified multi-fuel grill having improved features. Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a multi-fuel grill apparatus comprising a burner, a burner cover positioned over and spaced from the burner, a solid fuel tray and/or a firebox basin.

In accordance with an aspect of the invention, the burner cover comprises a lower flame deflector having opposite, downwardly-extending first angled walls linked at a substantially centered cover angled wall joint configured to deflect flames and heat around the burner cover.

In accordance with a further aspect of the invention, the burner cover comprises an upper debris deflector having a top wall and opposite, downwardly-extending deflector angled walls configured to shed debris away from the respective burner.

In accordance with a still further aspect of the invention, the solid fuel tray comprises opposite tray angled side walls configured to seat on the deflector angled walls so as to selectively suspend the tray between two burner covers.

In accordance with a still further aspect of the invention, the firebox basin comprises an upwardly-extending protrusion having opposite basin angled walls linked at a basin angled wall joint substantially vertically aligned with one or more of the burner and the cover angled wall joint.

In accordance with a still further aspect of the invention, at least one vent is formed in a front panel of a body of the multi-fuel grill apparatus configured to provide cooling of the front panel and any burner controls positioned therein.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings:

FIG. 5 is an enlarged perspective view of an exemplary burner cover thereof, in accordance with at least one embodiment;

FIG. 6 is an enlarged perspective view of an exemplary solid fuel tray thereof, in accordance with at least one embodiment;

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
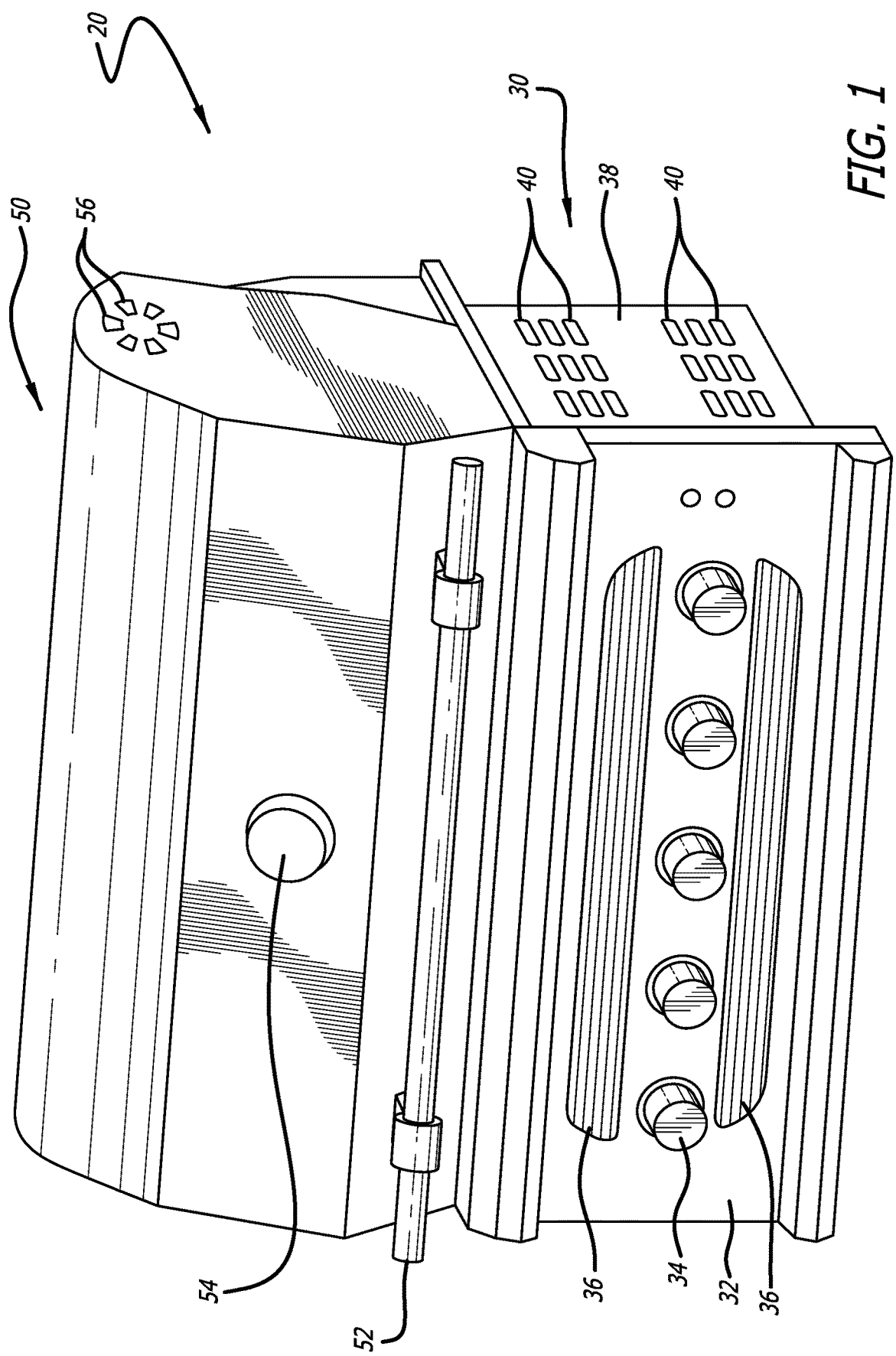
FIG. 1 is a perspective view of an exemplary multi-fuel grill apparatus, in accordance with at least one embodiment.

Turning now to FIG. 1, there is shown a perspective view of an exemplary embodiment of a multi-fuel grill apparatus 20. Here, primarily for context, it can be seen that the apparatus 20 generally comprises, in the exemplary embodiment, a body 30 and a lid 50 pivotally attached thereto so as to be selectively opened to gain access to the cooking space within the grill. Both components may be formed of any non-flammable or heat resistant material now known or later developed, including but not limited to stainless steel. The body 30 comprises a front panel 32 having one or more controls 34 for selective control of respective one or more burners 80 (FIG. 2) as well as vents 36 for communicating with the interior space of the grill, and specifically the body 30. One or more vents 40 may be similarly formed in the opposite body side panels 38 and even in the rear panel (not shown). Similarly, one or more vents 56 are shown as being formed in the lid 50, which is also equipped with a handle 52 for raising and lowering the lid 50 and a thermometer 54 for determining the temperature within the interior space of the grill, all generally in a manner now known or later developed in the art. Those skilled in the art will appreciate that the number, shape, and location of any such vents may vary, such that the particular configurations of the vents as shown and described herein are to be understood as merely illustrative and non-limiting. Most notably, regarding the front vents 36, while it will be appreciated that such cooperate with the other vents 40, 56 to create cross-flows for ventilation, particularly within the firebox basin 60 (FIG. 2) as between the front vents 36 and the side vents 40 and/or rear vents (not shown) formed in the body 30, a further unexpected benefit of the front vents 36 is their effect of cooling off the front panel 32 and the one or more control valves 34. Thus, as cool secondary air is pulled into the body 30, and the firebox basin 60 particularly, over or past the valves 34 and through the front vents 36, areas that are often touched when operating the grill 20, namely, the front panel 32 and related controls 34, are kept relatively cool, offering a safety and comfort benefit in the grill apparatus 20 according to aspects of the present invention. It will be appreciated that the overall configuration of the outside or cabinet of the grill apparatus 20 as comprising a body 30 and lid 50 is merely illustrative and non-limiting, here as might be installed permanently as a "built-in" within an indoor or outdoor countertop or the like, though may just as easily be configured with legs or a full cabinet for stand-alone installation and operation. Those skilled in the art will appreciate that any such grill configurations now known or later developed are possible according to aspects of the present invention without departing from its spirit and scope. Relatedly, all drawings included herewith are to be understood as illustrative and non-limiting and expressly are not to be taken dimensionally or to scale or to be indicative of the actual or proportional size of any of the components, whether such drawing is a schematic or otherwise.

Figure 2:
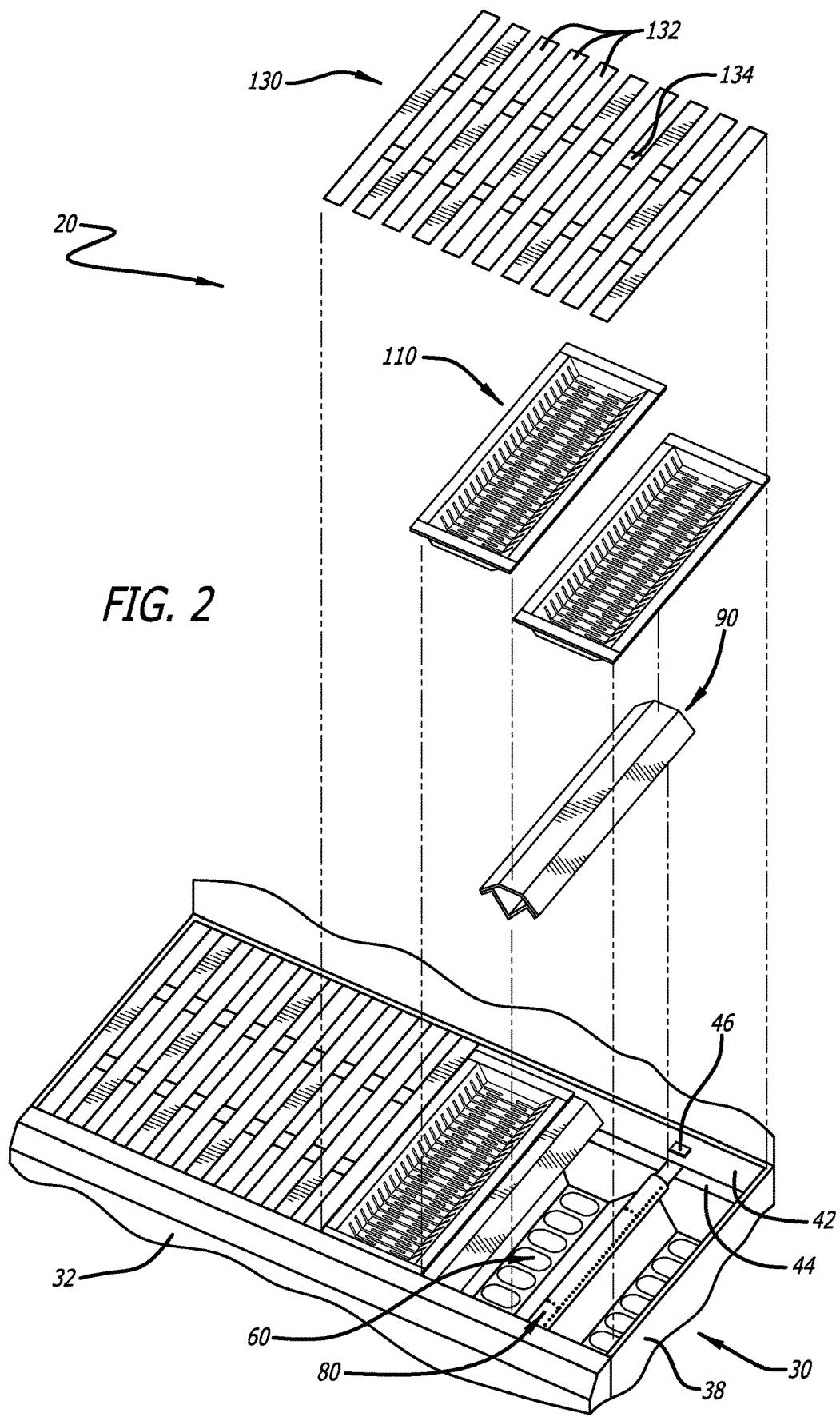
FIG. 2 is a reduced-scale partial exploded perspective view thereof, in accordance with at least one embodiment.

Referring next to FIG. 2, there is shown a reduced-scale partial exploded perspective view of the grill apparatus 20, here with the lid 50 (FIG. 1) and much of the body 30 removed for ease of viewing the interior components of the grill. As seen and will be better appreciated from the schematic of FIG. 3 discussed further below, at the bottom of the body 30 there is formed or positioned a firebox basin 60 beneath one or more somewhat tubular burners 80 spanning the body 30 from front to back. In the exemplary embodiment, a burner mount ledge 44 is formed in the rear panel 42 of the grill body 30, and though not shown a similar ledge may be formed in the front panel 32, on which ledges 44 the one or more burners 80 are installed so as to span the interior space of the grill within the body 30 above and offset from the firebox basin 60. Above and substantially aligned with each burner 80 are affixed to the front and rear panels 32, 42 of the grill body 30 offset burner cover mount tabs 46 for selectively receiving a respective burner cover 90 as shown, each such burner cover 90 being thus suspended also across the interior space of the grill, here substantially over and spaced from the respective burner 80, more about which is again said below. Next, one or more solid fuel trays 110 are selectively positioned within the interior space of the grill spaced from the firebox basin 60 and burners 80 as by seating on and spanning between adjacent burner covers 90. Finally, over one or more such burner 80, burner cover 90, and solid fuel tray 110 assemblies there is selectively positioned a cooking grate 130 comprising a series of substantially parallel and offset cooking bars 132 held in their relative positions to form the grate 130 by one or more support bars 134. Once again, it will be appreciated by those skilled in the art that a variety of such components and related configurations are possible according to aspects of the present invention without departing from its spirit and scope, such that the exemplary grill apparatus 20 is to be understood as illustrative and non-limiting.

Figure 3:
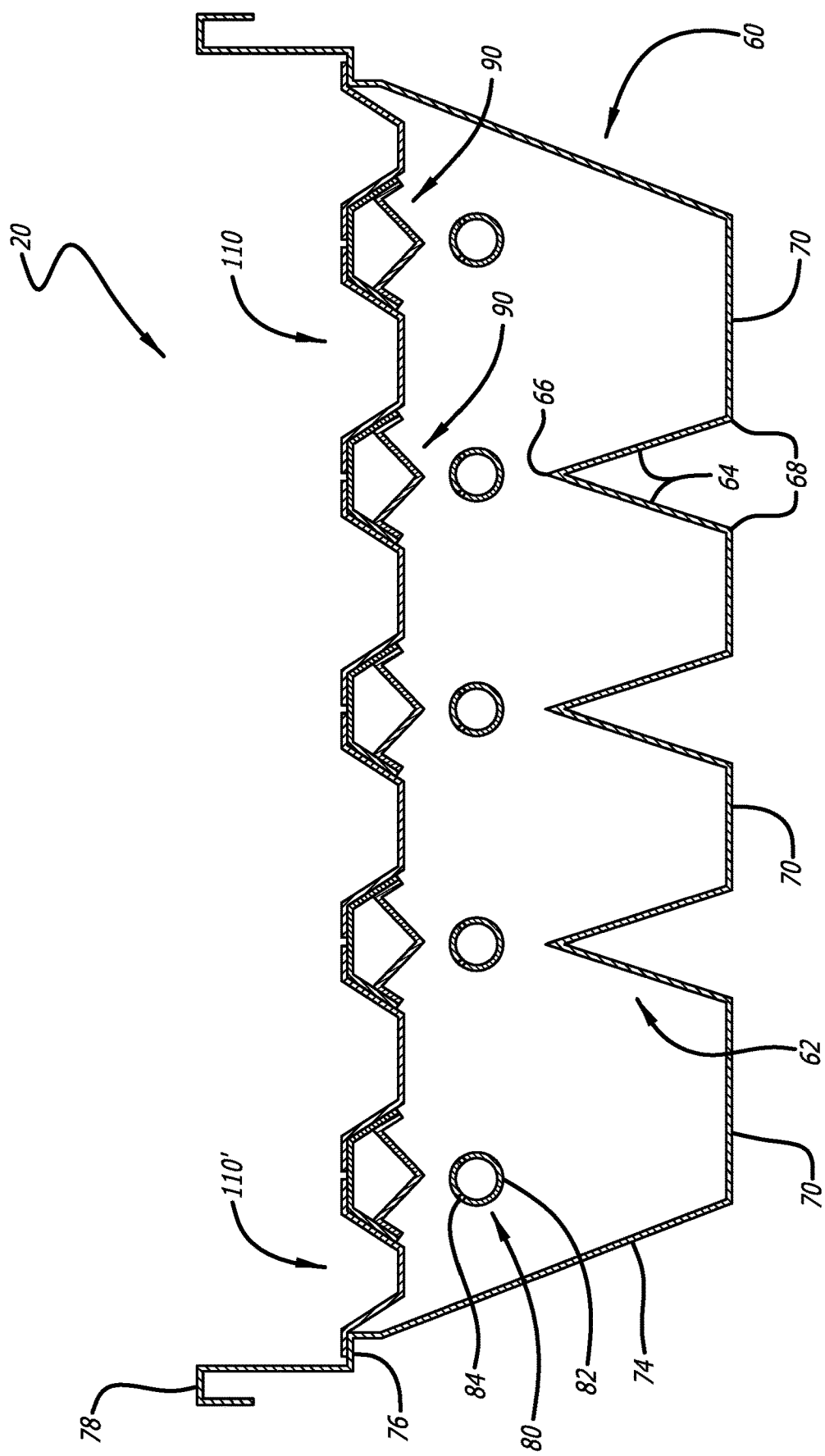
FIG. 3 is an enlarged partial front schematic view thereof, in accordance with at least one embodiment.
Figure 7:
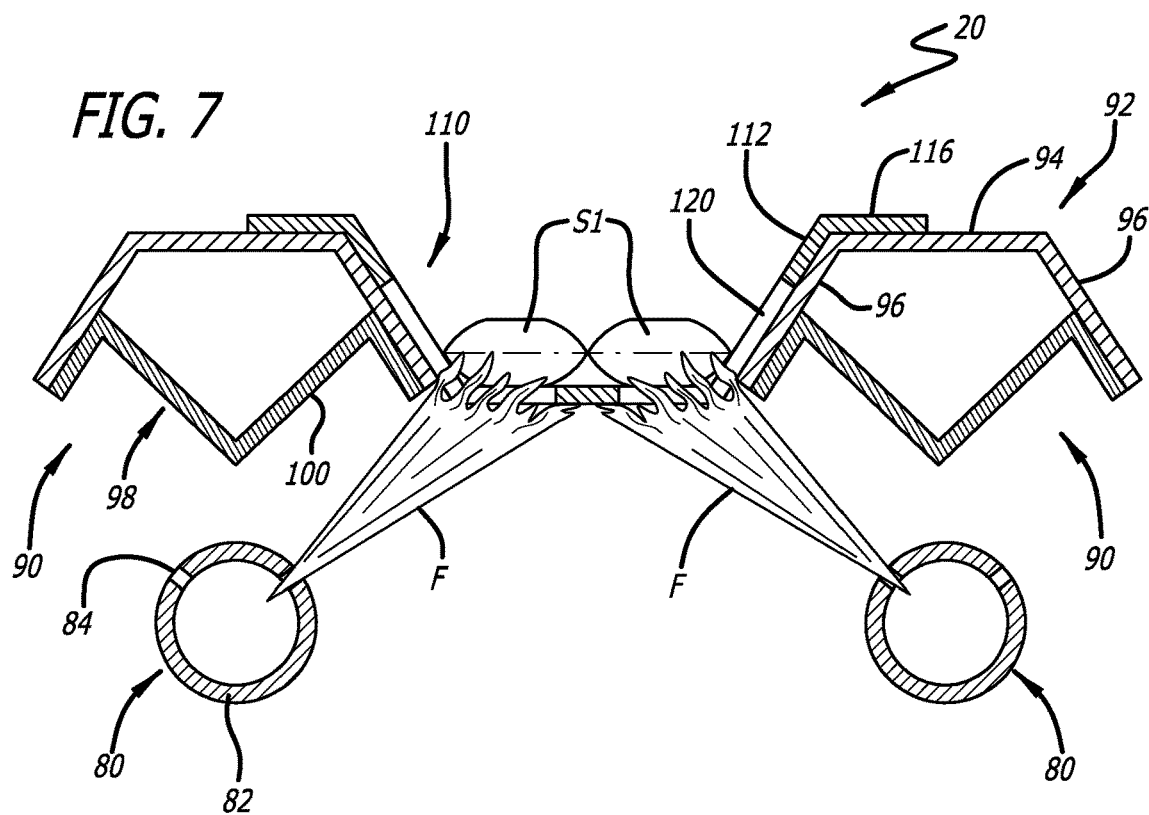
FIG. 7 is an enlarged partial front schematic view thereof in use, in accordance with at least one embodiment.

Turning to FIG. 3, there is shown an enlarged partial front schematic view of a grill apparatus 20 according to aspects of the present specification. For simplicity, in this view none of the body 30 or lid 50 of the grill enclosure are shown, but instead essentially the interior components that enable multi-fuel, or liquid and solid fuel, operation. The view as being from the front is essentially taken looking down the axes of the burners 80 and burner covers 90. At the bottom of the assembly and generally supporting the rest of the components is the firebox basin 60. Relatedly, as a threshold matter, while in the illustrated embodiment of FIGS. 1 and 2 the burners 80 and burner covers 90 are shown and described as being mounted on or suspended from the front and rear panels 32, 42 of the grill body 30, it will be appreciated that such could instead be assembled and completely self-contained within the firebox basin 60. As illustrated consistently among FIGS. 1-3, there are five burners 80 in the exemplary grill apparatus 20, and hence five controls 34 shown on the front panel 32 (FIG. 1), each substantially equally spaced along the length of the grill body 30. In one exemplary configuration, the five-burner grill apparatus has an overall length of approximately thirty-six inches (36") or three feet (3'). In a further alternative configuration, an eight-burner grill, or a grill apparatus 20 with eight substantially equally spaced burners 80, may have an overall length of approximately fifty-four inches (54") or four-and-a-half feet (4.5'). Those skilled in the art will appreciate that such arrangement and the number and configuration of the burners 80 is merely illustrative and non-limiting. With continued reference to the firebox basin 60 illustrated schematically in FIG. 3, as shown, it may be formed having extending substantially upwardly or vertically from the bottom wall 70 a plurality of spaced-apart protrusions 62. In the exemplary embodiment, each such protrusion 62 is formed by the connection of two offset angled walls 64 at an upper joint 66 defining the tip or apex of the respective protrusion 62. The opposite angled wall base edges 68 define the points of connection with and transition to the bottom wall 70 for each "A-shaped" protrusion 62. As shown in the exemplary five-burner grill apparatus 20, three such firebox basin protrusions 62 are formed extending substantially vertically upward from the basin bottom wall 70 so as to be substantially centered beneath and offset from the respective middle three burners 80 and burner covers 90. Opposite angled side walls 74 complete the firebox basin 60 by providing sloped surfaces adjacent to the outer two protrusions 62 beneath the outer two burners 80 and burner covers 90, more about all such sloped surfaces is said below particularly in connection with FIG. 8. In the exemplary schematic, the side walls 74 terminate opposite the bottom wall 70 in opposite side wall flanges 76 that themselves terminate in substantially vertical side wall arms 78, which it will be appreciated may form, in part, or interface with the body side panels 38 (FIG. 1) of the grill enclosure in forming the complete grill apparatus 20 as shown in FIG. 1. Referring still to FIG. 3, in the exemplary embodiment each burner 80 is substantially tubular in cross-section and so comprises a burner tube 82 having a plurality of holes 84 formed therein for the selective passage of liquid fuel combustion or a flame F as shown in FIG. 7. Directly above each of the exemplary five burners 80 there are positioned respective burner covers 90, more about which is said below in connection with FIGS. 5 and 7, respectively. Here, it is first again noted that the respective burner covers 90 are shown as being positioned substantially centered over and spaced from the burners 80. The solid fuel trays 110 are then suspended between burner covers 90, thus positioning the trays 110 substantially centered between the burners 80. As illustrated, in one embodiment the space between the outer burners 80 and covers 90 and the adjacent side walls 74 is relatively smaller than the space between adjacent burners 80 and covers 90 (i.e., the spacing between the middle three pairs of burners 80 and covers 90), such that a proportionately smaller tray 110' is formed and positioned at the outside gaps, or spanning the spaces between the outer burner covers 90 and the respective side wall flange 76 of the firebox basin 60 relative to the three middle trays 110. Those skilled in the art will again appreciate that a variety of other configurations, arrangements, and proportional sizes of such components of the grill apparatus 20 are possible without departing from the spirit and scope of the invention, such that the illustrated arrangement is to be understood as merely exemplary, it being noted that all solid fuel trays 110 illustrated in FIG. 2, for example, are substantially the same size.

Figure 4:
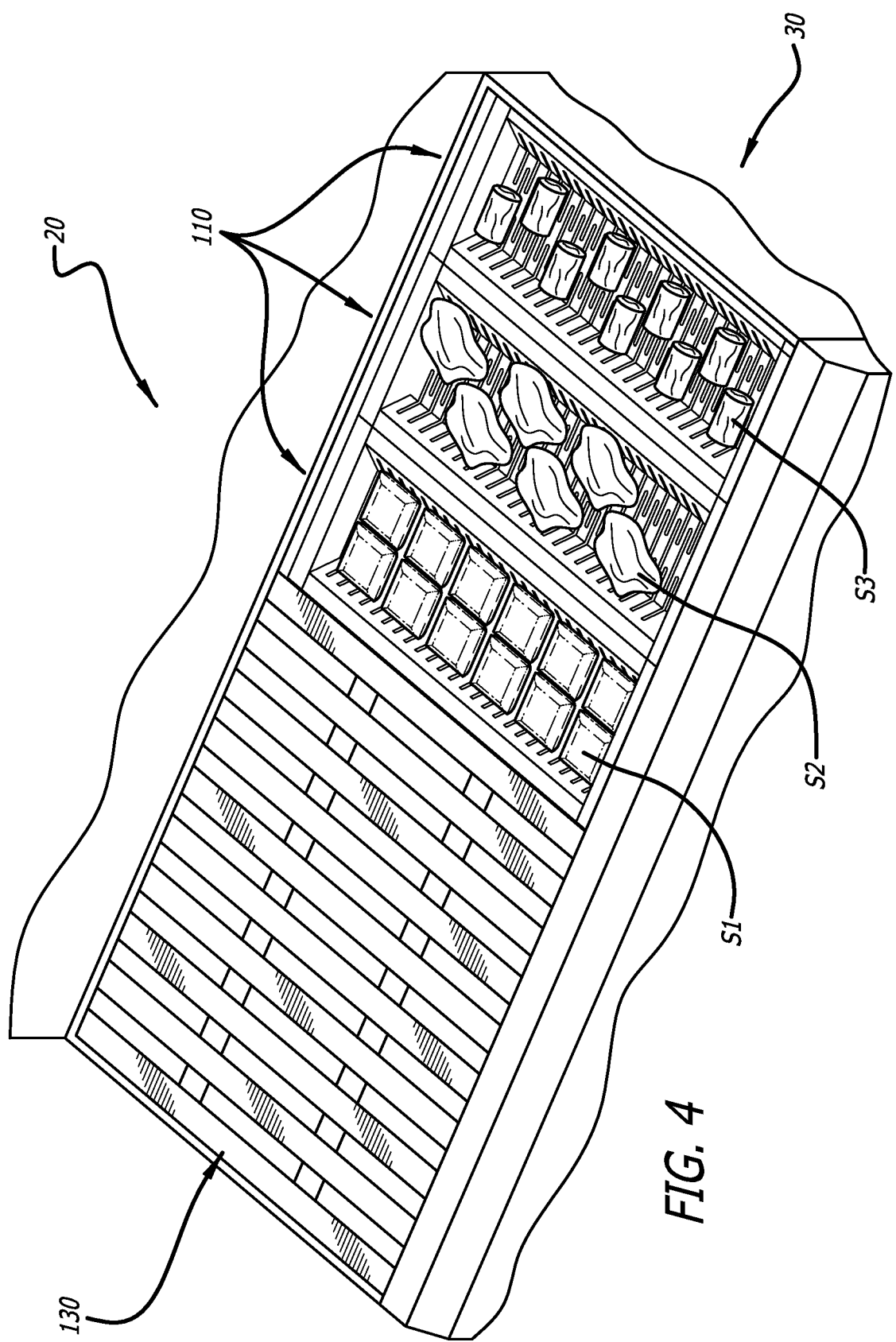
FIG. 4 is an enlarged partial perspective view thereof, in accordance with at least one embodiment.

Referring briefly to FIG. 4, there is shown a partial perspective view similar to FIG. 2, only now with all components assembled, rather than some exploded, and having exemplary solid fuels S1, S2, S3 placed in three of the trays 110, with the grate 130 on that portion of the grill removed for ease of viewing the trays 110. From left to right, in the first tray 110 shown there is placed solid fuel in the form of charcoal briquettes S1, in the second tray 110 there is placed solid fuel in the form of wood chips S2 or the like, such as hickory or mesquite chips, and in the third tray 110 there is placed pieces of woods logs or sticks. It will be appreciated that a virtually infinite variety of solid fuels can be placed in such trays 110 for use in a grill apparatus 20 according to aspects of the present invention, such that the exemplary fuels shown and described are to be understood as illustrative and non-limiting. Again, the number and actual or proportional sizes of any such components, including the illustrated solid fuels S1, S2, S3, are exemplary. It will also be appreciated that the same solid fuel can be used in all trays 110 or different fuels can be placed in each tray 110 as shown, or any combination thereof. Combustion of such solid fuels is further explained below in conjunction with FIG. 7.

Turning next to FIG. 5, there is shown an enlarged perspective view of an exemplary burner cover 90 as may be employed in a multi-fuel grill apparatus 20 according to aspects of the present invention, including the embodiments shown in FIGS. 2 and 3. The burner cover 90 generally comprises an upper debris deflector 92 and a lower flame deflector 98. First, the upper debris deflector is formed having a central lengthwise top wall 94 with opposite angled walls 96 depending laterally therefrom. The debris deflector 92 and its top and angled walls 94, 96 may be sized and configured so as to generally form a cover or shield above or over the burner 80 (FIGS. 2 and 3) and may be formed from a single piece of material as be bending, stamping or forming a metal sheet, such that the top and angled walls 94, 96 are integral. Or the top and angled walls 94, 96 may be formed separately and joined using any technique now known or later developed. It will be appreciated from the above discussion in connection with FIG. 2 that the top wall 94 is again configured so as to seat at its opposite ends on the burner cover mount tabs 46 formed within the body 30, or in some embodiments the firebox basin 60, of the grill 20 so as to selectively suspend the burner cover 90 therein. More about the operation of the debris deflector 92 component of the burner cover 90 is said below in connection with FIG. 7. With continued reference to FIG. 5, the exemplary burner cover 90 is also shown as comprising a lower flame deflector 98 adjacent to or adjoining the upper debris deflector 92. The flame deflector 98, the function of which will also be appreciated from FIG. 7 and the related discussion below, comprises in the exemplary embodiment two downwardly-projecting first angled walls 100 that come together at a point or angled wall joint 102 opposite the top wall 94 of the upper debris deflector 92. As shown in both FIGS. 3 and 7, when the burner cover 90 is installed substantially centered over a burner 80, the point or angled wall joint 102 of the lower flame deflector 98 of the burner cover 90 is pointing or directed at and spaced from the burner 80, with the first angled walls 100 extending up from the joint 102 and diverging away from each other toward the opposite angled walls 96 of the upper debris deflector 92. In the illustrated embodiment, the first angled walls 100 of the lower flame deflector 98 terminate at angled wall edges 104 that transition to second angled walls 106 that turn relative to the first angled walls 100 so as to follow or be substantially parallel with the angled walls 96 of the upper debris deflector 92; as shown, in the exemplary embodiment, the second angled walls 106 are immediately adjacent and affixed to the debris deflector angled walls 96. Once again, those skilled in the art will appreciate that any such configuration and related method of fabrication of such components and the resulting burner cover 90 is possible according to aspects of the present invention without departing from its spirit and scope, including but not limited to spot-welding, tack-welding, fastening, riveting, fusing, screwing, and the like. By way of further illustration, the entire burner cover 90, including the upper debris deflector 92 and the lower flame deflector 98 may be formed integrally as a unitary whole, such as by an extrusion process to form the profile or cross-section and then simply cut to length and finished. Again, any such configuration of the burner cover 90 is possible, such that the design illustrated is to be understood as merely exemplary and non-limiting.

Referring to FIG. 6, there is similarly shown an enlarged perspective view of an exemplary solid fuel tray 110 according to aspects of the present invention. As illustrated, the tray 110 may be formed having a substantially flat or horizontal bottom wall 118 from which extend opposite, lateral angled side walls 112 and opposite, substantially vertical or square end walls 114 so as to collectively form a bounded space for holding a solid fuel. There may be formed a plurality of slots 120 in the tray 110 for allowing debris from the solid fuel to fall down through and for allowing a flame F (FIG. 7) from a burner 80 (FIG. 7) to come up through to ignite and burn the solid fuel, more about which is said immediately below. As shown, the slots 120 may be formed laterally or widthwise in the tray 110, with some formed only in the bottom wall 118 and some formed so as to intersect both the bottom wall 118 and at least one angled side wall 112. In the exemplary embodiments the pattern of slots 120 alternates along the length of the tray 110. Once more, those skilled in the art will appreciate that a variety of configurations of the tray 110, including the formation of the walls 112, 114, 118 and the arrangement of the slots 120, are possible according to aspects of the present invention without departing from its spirit and scope. As also seen in FIG. 6, a perimeter flange 116 may be formed about the side and end walls 112, 114 opposite the bottom wall 118 but substantially parallel thereto. The perimeter flange 116 may be formed integrally with one or both of the side and end walls 112, 114, and all such features of the tray 110 may thus be formed from any appropriate material and using any appropriate fabrication technique now known or later developed. It will be appreciated, specifically, that the configuration and actual and proportional size of the tray 110 and its walls 112, 114, 118 and flange 116 may vary widely depending on the context, such that the illustrated tray 110 is to be understood as exemplary and non-limiting. Context can include both the design of the overall grill apparatus 20 and, relatedly, the number and arrangement of burners 80, as well as the kinds of solid fuels to be employed, it being appreciated that the arrangement of the walls 112, 114, 118 defines the effective volume of the tray 110.

Turning now to FIG. 7, there is shown an enlarged partial front schematic view of an exemplary grill apparatus 20 in use, in accordance with at least one embodiment. Particularly, there are shown two spaced-apart burner covers 90 with a solid fuel tray 110 suspended therebetween. As will be appreciated from both FIG. 7 and FIGS. 3-6 and the related foregoing discussion, the configurations of particularly the top and angled walls 94, 96 of the upper debris deflector 92 of the burner cover 90 and of the perimeter flange 116 and the angled side walls 112 of the tray 110 enables a nesting fit between them. That is, the angles of both the cover angled walls 96 and of the tray angled side walls 112 are configured to be substantially equivalent such that the adjacent walls are substantially flush when the tray 110 is dropped into position between opposite burner covers 90. It will be appreciated that the engagement of such angled walls 96, 112 alone is sufficient to suspend the tray 110 in position spanning opposite burner covers 90. Further provided is the tray perimeter flange 116 that extends laterally and substantially horizontally from the tray angled side walls 112 so as to also engage substantially flush with the substantially flat and horizontal top wall 94 of the cover debris deflector 92, which engagement also assists in holding the tray 110 in position, it being appreciated that the engagement of the tray flange 116 with the burner cover top wall 94 would also be sufficient to suspend the tray 110 between opposite burner covers 90. Accordingly, those skilled in the art will appreciate that one or both of the mating horizontal or angled walls of the respective burner cover and tray or any other such configuration or geometric arrangement may be employed according to aspects of the present invention without departing from its spirit and scope. It will also be appreciated that the width of the bottom wall 118 of the tray 100 effectively corresponds to the spacing of both the burners 80 and the respective burner covers 90; not that the width of the bottom wall 118 is numerically equivalent to the on-center spacing of the burners 80 or burner covers 90, but simply to say that as such spacing increases or decreases, the width of the bottom wall 118 would increase or decrease accordingly or proportionately. In the exemplary embodiment, the width of the tray bottom wall 118 is substantially equivalent to the shortest distance between edges of opposite deflector angled walls 96, such that the bottom wall 118 is positioned vertically at a location roughly corresponding to the ends of the deflector and first angled walls 96, 100 of the burner cover 90, though once more those skilled in the art will appreciate that all such geometrical configurations are merely illustrative and non-limiting. As also shown in FIG. 7, liquid fuel burners 80 may again be positioned within the grill apparatus 20 substantially centered beneath respective burner covers 90. The burners 80 are again shown as comprising a burner tube 82 that is being substantially cylindrical, though it will be appreciated that a variety of other shapes of the burners 80, and burner tubes 82 specifically, are possible. In the illustrated cylindrical burner tube 82 there are shown formed therein opposite burner holes 84 at angular positions substantially corresponding to the first angled walls 100 of the lower flame deflector 98 of the burner cover 90. By way of illustration and not limitation, the angular position of the burner holes 84 and the angle of each first angled wall 100 is approximately forty-five degrees(45°). Advantageously, flames F emitted from such burner holes 84 as through controlled combustion of a liquid fuel (liquid fuel itself not shown within burner 80) within the burner tube 82 leave such burner 80 at an angle and then follow or are deflected along or away from the first angled walls 100 of the lower flame deflector 98 of the burner cover 90 and thus toward the tray 110 suspended between opposite such burner covers 90 and hence respective burners 80. As illustrated schematically, such flames F are able to pass through the slots 120 formed in the tray 110 and thereby heat or ignite any solid fuel contained therein—charcoal briquettes S1 in the exemplary use—the slots 120 further enabling or helping the ignited solid fuel to "breathe." At the same time, the locations of the burners 80 substantially directly beneath the respective burner covers 90 and the related configuration of particularly the upper debris deflector 92 thereof enables debris from both the solid fuel S1 and from any food being cooked on a grate above (not shown) to be directed down between the burner covers 90 as by following the downwardly sloped opposite angled walls 96 of the upper debris deflector 92 and through the slots 120 in the tray 110 and, ultimately, away from the burners 80 so as to prevent unwanted soiling or clogging. Those skilled in the art will appreciate that the upper debris deflector 92 of each burner cover 90 will have the same effect even in the case where no solid fuels are to be employed and thus no trays 110 are positioned between the burner covers 90. In this way, a grill apparatus 20 according to aspects of the present invention provides an arrangement wherein multiple fuels are or may be employed in grilling conveniently and effectively. To use the grill 20 in a "dual fuel" mode, one or more solid fuel trays 110 may simply be removably installed between adjacent burner covers 90 and the selected solid fuel placed therein; whereas single-fuel or liquid-fuel-only operation is accomplished just as easily by removing the one or more solid fuel trays 110. Again, it will be appreciated that a variety of other configurations of the grill apparatus 20, and specifically its burner cover 90 and tray 110 arrangement, are possible according to aspects of the present invention without departing from its spirit and scope, such that the illustrated embodiments are to be understood as merely exemplary and non-limiting. By way of further example, in addition to the above-described scenarios of a single liquid fuel or "gas grill" use or operation of the grill apparatus 20 as by simply removing the one or more solid fuel trays 110 and operating the one or more burners 80 and the "dual fuel" use or operation wherein the solid fuel trays 110 are utilized in combination with the one or more burners 80, there is also the possibility with the disclosed grill arrangement of simply placing the solid fuel trays in position as shown and described and then rather than operating the one or more burners 80, simply igniting the solid fuel in a more conventional fashion as by using a lighter or match and returning the grate 130 over the one or more solid fuel trays 110 so as to effectively operate the grill 20 as a solid fuel grill or "charcoal grill." It will be appreciated that the present design conveniently allows for such by placing the solid fuel trays 110 immediately beneath the grate 130 and by configuring the trays 110 to rest upon and span adjacent burner covers 90, including in the exemplary embodiment configuring each tray 110 with a perimeter flange 116, so as to form a substantially continuous solid fuel retaining area.

Figure 8:
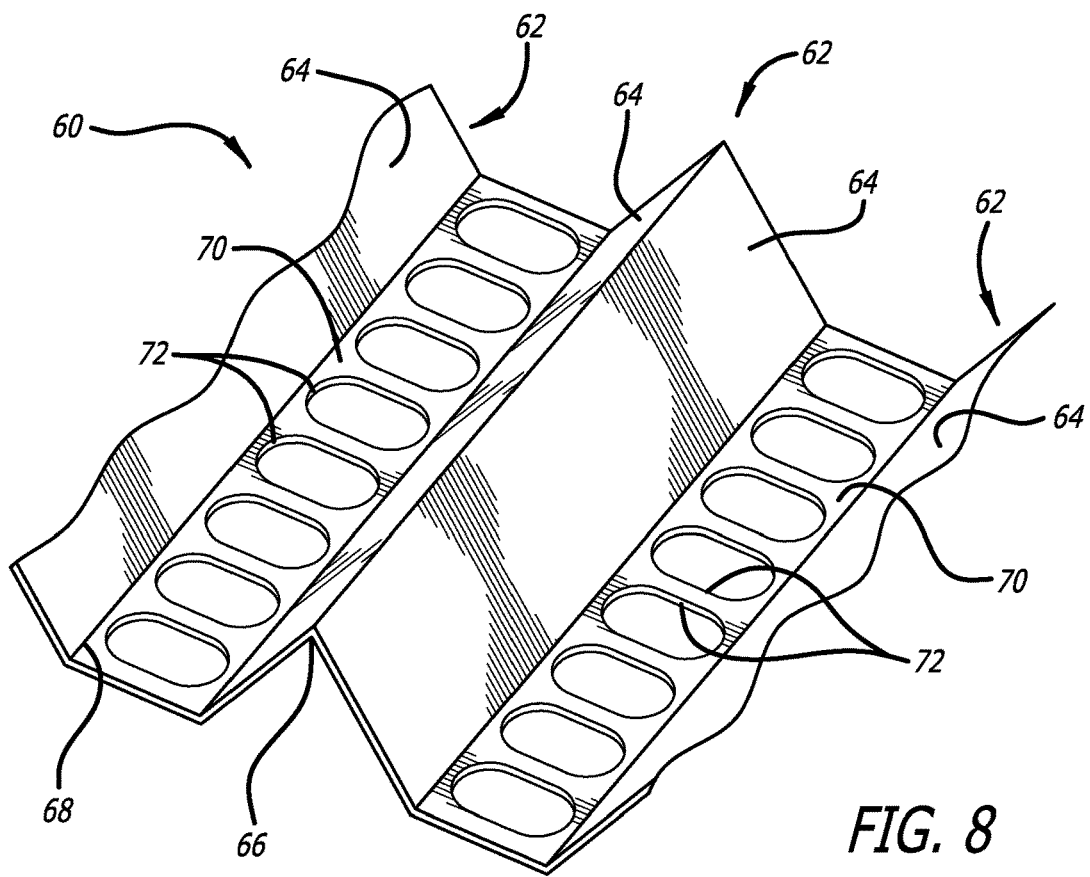
FIG. 8 is an enlarged partial perspective view of an exemplary firebox basin thereof, in accordance with at least one embodiment.

Finally, referring to FIG. 8, there is shown an enlarged partial perspective view of an exemplary firebox basin 60 according to aspects of the present invention. The firebox basin 60 has substantially upwardly-extending protrusions 62 that, as best illustrated in FIG. 3 and discussed above, are in the exemplary embodiment positioned on the floor or bottom wall 70 of the basin 60 so to be substantially centered beneath the burners 80 and thus the burner covers 90. Accordingly, as the debris from any food being cooked (not shown) or solid fuel being combusted sheds off the cover debris deflector 92, whether or not then down through slots 120 in the tray 110, such debris then falls to the bottom of the firebox basin 60. Those skilled in the art will appreciate that the angled-wall protrusions 92 thus guide any such debris toward the bottom wall 70 thus to and through a plurality of relatively closely spaced apart bottom wall openings 72 and out of the firebox basin 60 altogether and, in one embodiment, into a catch-tray (not shown) below the firebox basin 60 for collecting and later discarding any such debris. Put another way, any debris originating from higher within the body 30 of the grill 20, or within the firebox basin 60 and sluffed off of the suspended hardware therein as above-described, would fall onto and follow downwardly the angled walls 64 of the protrusions 62 and to the bottom wall 70 where are formed multiple openings 72 for the passage therethrough of such debris. In this way, the build-up within the grill body 30 of debris is substantially minimized by design, again while protecting the burners 80 from clogging and so contributing to the long-term and safe performance of the grill apparatus 20. Once more, those skilled in the art will appreciate that a variety of other configurations of the firebox basin 60, and particularly the protrusions 62 and related bottom wall openings 72, are possible according to aspects of the present invention without departing from its spirit and scope. By way of illustration and not limitation, an alternative grill apparatus 20 may comprise eight burners 80, including six middle burners and two opposite outer burners, eight burner covers 90 positioned over and spaced from the respective eight burners 80, and six firebox basin protrusions 62 formed extending substantially vertically upward from the basin bottom wall 70 so as to be substantially centered beneath and offset from the six middle burners 80 and respective six burner covers 90. It will be appreciated that the number of burners 80 in the grill apparatus 20 and related components may vary, including but not limited to one burner, two burners, three burners, four burners, five burners, six burners, seven burners, eight burners, nine burners, ten burners, eleven burners, twelve burners, thirteen burners, fourteen burners, fifteen burners, sixteen burners, seventeen burners, eighteen burners, nineteen burners, or twenty or more burners. In any such embodiment, the burners 80 may all be of substantially the same construction and configuration, or such may vary from burner to burner. A corresponding burner cover 90 may be positioned over some or all of the respective burners 80, depending on a number of factors. The exemplary pattern of a middle group of burners flanked by two opposite, outer burners is also to be understood as illustrative and non-limiting, as a variety of other arrangements are possible according to aspects of the present invention without departing from its spirit and scope.

Aspects of the present specification may also be described as follows:

1. A multi-fuel grill apparatus comprising: at least two spaced-apart burners; at least two burner covers positioned over and spaced from the respective at least two burners, each burner cover comprising an upper debris deflector having a deflector top wall and opposite, downwardly-extending deflector angled walls configured to shed debris away from the respective burner; and at least one solid fuel tray comprising opposite tray angled side walls configured to seat on the deflector angled walls so as to selectively suspend the tray between the at least two burner covers.

2. The apparatus of embodiment 1, wherein the solid fuel tray further comprises: a tray bottom wall positioned between and connecting the opposite tray angled side walls; and a plurality of slots formed in the tray bottom for allowing a solid fuel placed in the tray to be ignited or breathe.

3. The apparatus of embodiment 2, wherein the slots either are formed only in the tray bottom wall or in the tray bottom wall and at least one tray angled side wall.

4. The apparatus of embodiment 2 or embodiment 3, wherein the slots form an alternating pattern.

5. The apparatus of any of embodiments 2-4, wherein the slots are oriented laterally and are substantially parallel to each other.

6. The apparatus of any of embodiments 2-5, wherein the solid fuel tray further comprises opposite end walls positioned between and connecting the opposite tray angled side walls and also connecting to the tray bottom wall, thereby bounding an upwardly-opening solid fuel retaining area of the solid fuel tray.

7. The apparatus of any of embodiments 2-6, wherein the solid fuel tray further comprises a perimeter flange.

8. The apparatus of embodiment 7, wherein the perimeter flange extends substantially laterally outwardly from at least the opposite tray angled side walls substantially opposite and parallel to the tray bottom wall.

9. The apparatus of embodiment 7 or embodiment 8, wherein the perimeter flange is configured for selectively seating on the deflector top walls of respective adjacent burner covers.

10. The apparatus of any of embodiments 7-9, wherein the perimeter flange extends substantially laterally outwardly from both the opposite tray angled side walls and the opposite tray end walls.

11. The apparatus of any of embodiments 2-10, wherein the width of the tray bottom wall substantially corresponds to the spacing of both the at least two spaced-apart burners and the respective at least two burner covers.

12. The apparatus of any of embodiments 1-11, wherein the burner cover further comprises a lower flame deflector installed adjacent the upper debris deflector, the lower flame deflector having opposite downwardly-projecting first angled walls that come together at a cover angled wall joint opposite the top wall of the upper debris deflector, the first angled walls extending up from the cover angled wall joint and diverging away from each other toward the opposite deflector angled walls of the upper debris deflector, the first angled walls of the flame deflector thereby configured to deflect flames and heat around the burner cover.

13. The apparatus of embodiment 12, wherein the first angled walls of the lower flame deflector terminate at angled wall edges that transition to second angled walls that turn relative to the first angled walls so as to be substantially parallel with the deflector angled walls of the upper debris deflector.

14. The apparatus of embodiment 13, wherein the second angled walls are immediately adjacent and affixed to the debris deflector angled walls.

15. The apparatus of any of embodiments 12-14, wherein the burner comprises a burner tube and a plurality of burner holes formed within the burner tube, the burner holes being positioned at angular positions substantially corresponding to the first angled walls of the lower flame deflector, wherein flames emitted from the burner holes within the burner tube leave the burner at an angle and then are deflected away from the first angled walls of the lower flame deflector.

16. The apparatus of embodiment 15, wherein the angular position of the burner holes and the angle of each first angled wall is approximately forty-five degrees (45°).

17. The apparatus of any of embodiments 1-16, further comprising a firebox basin positioned beneath the at least two spaced-apart burners, the firebox basin having at least one upwardly-extending protrusion having opposite basin angled walls linked at a basin angled wall joint, wherein at least one burner, the respective cover angled wall joint and the basin angled wall joint are substantially vertically aligned.

18. The apparatus of embodiment 17, wherein: the protrusion further comprises opposite angled wall base edges at which the protrusion connects to a bottom wall of the firebox basin; and a plurality of relatively closely spaced apart bottom wall openings are formed in the bottom wall for passage of debris therethrough and out of the firebox basin in cooperation with the sloped basin angled walls of the at least one upwardly-extending protrusion.

19. The apparatus of any of embodiments 1-18, comprising: five burners, including three middle burners and two opposite outer burners; five burner covers positioned over and spaced from the respective five burners; and three firebox basin protrusions formed extending substantially vertically upward from the basin bottom wall so as to be substantially centered beneath and offset from the three middle burners and respective three burner covers.

20. The apparatus of any of embodiments 1-18, comprising: eight burners, including six middle burners and two opposite outer burners; eight burner covers positioned over and spaced from the respective eight burners; and six firebox basin protrusions formed extending substantially vertically upward from the basin bottom wall so as to be substantially centered beneath and offset from the six middle burners and respective six burner covers.

21. The apparatus of any of embodiments 17-20, wherein the firebox basin further comprises opposite basin angled side walls extending substantially upwardly from the bottom wall, each basin angled side wall terminating opposite the bottom wall in a substantially outwardly-extending side wall flange.

22. The apparatus of embodiment 21, wherein the side wall flange is vertically positioned substantially adjacent to the top wall of the upper debris deflector, whereby the side wall flange and the adjacent burner cover cooperate in selectively supporting the at least one solid fuel tray.

23. The apparatus of embodiment 21 or embodiment 22, wherein the spacing between the side wall flange and the adjacent burner cover is different than the spacing between adjacent burner covers, such that a solid fuel tray positioned between a side wall flange and an adjacent burner cover is sized differently than a solid fuel tray positioned between adjacent burner covers.

24. The apparatus of any of embodiments 21-23, wherein each basin angled side wall further comprises as extending substantially vertically from the respective side wall flange a side wall arm.

25. The apparatus of any of embodiments 17-24, wherein the deflector top wall is substantially horizontal and configured to seat on opposite burner cover mount tabs formed within the firebox basin.

26. The apparatus of any of embodiments 17-25, further comprising: a body having a front panel, opposite side panels connected with the front panel, and a rear panel connected with the side panels opposite the front panel, the at least two spaced-apart burners and the firebox basin being contained within the body; and a lid pivotally installed on the body so as to selectively open and close the body.

27. The apparatus of embodiment 26, wherein at least two controls are configured on the front panel corresponding to the at least two burners.

28. The apparatus of embodiment 27, wherein at least one front panel vent is formed in the front panel adjacent to the at least two controls.

29. The apparatus of embodiment 27 or embodiment 28, wherein the at least two controls are oriented horizontally and two offset front panel vents are formed in the front panel above and below the at least two controls.

30. The apparatus of any of embodiments 26-29, wherein the side panels are formed with side panel vents.

31. The apparatus of any of embodiments 26-30, wherein a burner mount ledge is formed in the rear panel of the body on which burner mount ledge the at least two burners are installed so as to span the interior space of the grill apparatus within the body above and offset from the firebox basin.

32. The apparatus of any of embodiments 26-31, wherein the top wall of the debris deflector of the burner cover is substantially horizontal and configured to seat on opposite burner cover mount tabs formed within the body.

33. The apparatus of any of embodiments 26-32, wherein the firebox basin is formed with side wall arms configured to interface with the body side panels in forming the complete grill apparatus.

34. The apparatus of any of embodiments 26-33, wherein the firebox basin is integral with at least the front and rear panels of the body.

35. The apparatus of any of embodiments 26-34, wherein the firebox basin is integral with at least the side panels of the body.

36. The apparatus of any of embodiments 26-35, wherein the firebox basin is integral with the front, rear, and side panels of the body.

37. The apparatus of any of embodiments 26-36, wherein the lid comprises a handle.

38. The apparatus of any of embodiments 26-37, wherein the lid comprises a thermometer.

39. The apparatus of any of embodiments 26-38, wherein the lid comprises at least one lid vent.

40. The apparatus of any of embodiments 26-39, further comprising a grate configured to be selectively suspended within the body over the at least two spaced-apart burners and the firebox basin.

41. The apparatus of embodiment 40, wherein the grate comprises a plurality of cooking bars and at least one support bar securing the cooking bars in a substantially offset and parallel arrangement.

42. The apparatus of any of embodiments 1-41, wherein a solid fuel placed within the at least one solid fuel tray is selected from the group consisting of charcoal, wood chips, and wood pieces.

43. The apparatus of any of embodiments 1-42, wherein only at least one of the at least two spaced-apart burners is operated and the at least one solid fuel tray and any related solid fuels are not employed.

44. The apparatus of any of embodiments 1-42, wherein only the at least one solid fuel tray and any related solid fuels are employed and the at least two spaced-apart burners are not operated.

45. The apparatus of any of embodiments 1-42, wherein both the at least one solid fuel tray and any related solid fuels are employed and at least one of the at least two spaced-apart burners is operated.

46. A multi-fuel grill apparatus comprising: a burner; a burner cover positioned over and spaced from the burner, the burner cover comprising a lower flame deflector having opposite, downwardly-extending first angled walls linked at a substantially centered cover angled wall joint; and a firebox basin having an upwardly-extending protrusion having opposite basin angled walls linked at a basin angled wall joint, the burner, the cover angled wall joint and the basin angled wall joint being substantially vertically aligned.

47. The apparatus of embodiment 46, wherein the burner comprises a burner tube and a plurality of burner holes formed within the burner tube, the burner holes being positioned at angular positions substantially corresponding to the first angled walls of the lower flame deflector, wherein flames emitted from the burner holes within the burner tube leave the burner at an angle and then are deflected away from the first angled walls of the lower flame deflector.

48. The apparatus of embodiment 47, wherein the angular position of the burner holes and the angle of each first angled wall is approximately forty-five degrees (45°).

49. The apparatus of any of embodiments 46-48, wherein the burner cover further comprises an upper debris deflector having a top wall and opposite, downwardly-extending deflector angled walls configured to shed debris away from the burner.

50. The apparatus of embodiment 49, wherein the top wall is substantially horizontal and configured to seat on opposite burner cover mount tabs formed within the firebox basin.

51. The apparatus of embodiment 49 or embodiment 50, wherein the first angled walls extend up from the cover angled wall joint diverging away from each other toward the opposite deflector angled walls of the upper debris deflector, the first angled walls of the flame deflector thereby configured to deflect flames and heat around the burner cover.

52. The apparatus of any of embodiments 49-51, wherein the first angled walls of the lower flame deflector terminate at angled wall edges that transition to second angled walls that turn relative to the first angled walls so as to be substantially parallel with the deflector angled walls of the upper debris deflector.

53. The apparatus of embodiment 52, wherein the second angled walls are immediately adjacent and affixed to the debris deflector angled walls.

54. The apparatus of any of embodiments 49-53, further comprising: at least two spaced-apart burners; at least two burner covers positioned over and spaced from the respective at least two burners; and at least one solid fuel tray comprising opposite tray angled side walls configured to seat on the deflector angled walls of the respective spaced-apart at least two burner covers so as to selectively suspend the tray between the at least two burner covers.

55. The apparatus of embodiment 54, wherein the solid fuel tray further comprises: a tray bottom wall positioned between and connecting the opposite tray angled side walls; and a plurality of slots formed in the tray bottom for allowing a solid fuel placed in the tray to be ignited or breathe.

56. The apparatus of embodiment 55, wherein the slots either are formed only in the tray bottom wall or in the tray bottom wall and at least one tray angled side wall.

57. The apparatus of embodiment 55 or embodiment 56, wherein the slots form an alternating pattern.

58. The apparatus of any of embodiments 55-57, wherein the slots are oriented laterally and are substantially parallel to each other.

59. The apparatus of any of embodiments 55-58, wherein the solid fuel tray further comprises opposite end walls positioned between and connecting the opposite tray angled side walls and also connecting to the tray bottom wall, thereby bounding an upwardly-opening solid fuel retaining area of the solid fuel tray.

60. The apparatus of any of embodiments 55-59, wherein the solid fuel tray further comprises a perimeter flange.

61. The apparatus of embodiment 60, wherein the perimeter flange extends substantially laterally outwardly from at least the opposite tray angled side walls substantially opposite and parallel to the tray bottom wall.

62. The apparatus of embodiment 60 or embodiment 61, wherein the perimeter flange is configured for selectively seating on the deflector top walls of respective adjacent burner covers.

63. The apparatus of any of embodiments 60-62, wherein the perimeter flange extends substantially laterally outwardly from both the opposite tray angled side walls and the opposite tray end walls.

64. The apparatus of any of embodiments 55-63, wherein the width of the tray bottom wall substantially corresponds to the spacing of both the at least two spaced-apart burners and the respective at least two burner covers.

65. The apparatus of any of embodiments 54-64, wherein a solid fuel placed within the at least one solid fuel tray is selected from the group consisting of charcoal, wood chips, and wood pieces.

66. The apparatus of any of embodiments 54-65, wherein only at least one of the at least two spaced-apart burners is operated and the at least one solid fuel tray and any related solid fuels are not employed.

67. The apparatus of any of embodiments 54-66, wherein only the at least one solid fuel tray and any related solid fuels are employed and the at least two spaced-apart burners are not operated.

68. The apparatus of any of embodiments 54-67, wherein both the at least one solid fuel tray and any related solid fuels are employed and at least one of the at least two spaced-apart burners is operated.

69. The apparatus of any of embodiments 49-68, wherein the top wall of the debris deflector of the burner cover is substantially horizontal and configured to seat on opposite burner cover mount tabs formed within the body.

70. The apparatus of any of embodiments 46-69, wherein: the protrusion further comprises opposite angled wall base edges at which the protrusion connects to a bottom wall of the firebox basin; and a plurality of relatively closely spaced apart bottom wall openings are formed in the bottom wall for passage of debris therethrough and out of the firebox basin in cooperation with the sloped basin angled walls of the at least one upwardly-extending protrusion.

71. The apparatus of any of embodiments 46-70, comprising: five burners, including three middle burners and two opposite outer burners; five burner covers positioned over and spaced from the respective five burners; and three firebox basin protrusions formed extending substantially vertically upward from the basin bottom wall so as to be substantially centered beneath and offset from the three middle burners and respective three burner covers.

72. The apparatus of any of embodiments 46-70, comprising: eight burners, including six middle burners and two opposite outer burners; eight burner covers positioned over and spaced from the respective eight burners; and six firebox basin protrusions formed extending substantially vertically upward from the basin bottom wall so as to be substantially centered beneath and offset from the six middle burners and respective six burner covers.

73. The apparatus of any of embodiments 46-72, wherein the firebox basin further comprises opposite basin angled side walls extending substantially upwardly from the bottom wall, each basin angled side wall terminating opposite the bottom wall in a substantially outwardly-extending side wall flange.

74. The apparatus of embodiment 73, wherein the side wall flange is vertically positioned substantially adjacent to the top wall of the upper debris deflector, whereby the side wall flange and the adjacent burner cover cooperate in selectively supporting the at least one solid fuel tray.

75. The apparatus of embodiment 74, wherein the spacing between the side wall flange and the adjacent burner cover is different than the spacing between adjacent burner covers, such that a solid fuel tray positioned between a side wall flange and an adjacent burner cover is sized differently than a solid fuel tray positioned between adjacent burner covers.

76. The apparatus of any of embodiments 73-75, wherein each basin angled side wall further comprises as extending substantially vertically from the respective side wall flange a side wall arm.

77. The apparatus of any of embodiments 46-76, further comprising: a body having a front panel, opposite side panels connected with the front panel, and a rear panel connected with the side panels opposite the front panel, the at least two spaced-apart burners and the firebox basin being contained within the body; and a lid pivotally installed on the body so as to selectively open and close the body.

78. The apparatus of embodiment 77, wherein a control is configured on the front panel corresponding to the burner.

79. The apparatus of embodiment 78, wherein at least one substantially oriented front panel vent is formed in the front panel adjacent to the control.

80. The apparatus of embodiment 78 or embodiment 79, wherein the control is oriented horizontally and two offset front panel vents are formed in the front panel above and below the control.

81. The apparatus of any of embodiments 77-80, wherein the side panels are formed with side panel vents.

82. The apparatus of any of embodiments 77-81, wherein a burner mount ledge is formed in the rear panel of the body on which burner mount ledge the burner is installed so as to span the interior space of the grill apparatus within the body above and offset from the firebox basin.

83. The apparatus of any of embodiments 77-82, wherein the firebox basin is formed with side wall arms configured to interface with the body side panels in forming the complete grill apparatus.

84. The apparatus of any of embodiments 77-83, wherein the firebox basin is integral with at least the front and rear panels of the body.

85. The apparatus of any of embodiments 77-84, wherein the firebox basin is integral with at least the side panels of the body.

86. The apparatus of any of embodiments 77-85, wherein the firebox basin is integral with the front, rear, and side panels of the body.

87. The apparatus of any of embodiments 77-86, wherein the lid comprises a handle.

88. The apparatus of any of embodiments 77-87, wherein the lid comprises a thermometer.

89. The apparatus of any of embodiments 77-88, wherein the lid comprises at least one lid vent.

90. The apparatus of any of embodiments 77-89, further comprising a grate configured to be selectively suspended within the body over the at least two spaced-apart burners and the firebox basin.

91. The apparatus of embodiment 90, wherein the grate comprises a plurality of cooking bars and at least one support bar securing the cooking bars in a substantially offset and parallel arrangement.

In closing, regarding the exemplary embodiments of the present invention as shown and described herein, it will be appreciated that a multi-fuel apparatus is disclosed and configured for selectively operating on only liquid fuel, on only solid fuel, or on a combination of liquid and solid fuels. Because the principles of the invention may be practiced in a number of configurations beyond those shown and described, it is to be understood that the invention is not in any way limited by the exemplary embodiments, but is generally directed to a multi-fuel grill apparatus and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A grill apparatus comprising:
   at least two spaced-apart burners; and
   at least two burner covers positioned over and spaced from the respective at least two spaced-apart burners, each burner cover comprising an upper debris deflector having a deflector top wall and opposite, downwardly-extending deflector angled walls configured to shed debris away from the respective burner, each burner cover further comprising a lower flame deflector installed adjacent the upper debris deflector, the lower flame deflector having opposite downwardly-projecting first angled walls that come together at a cover angled wall joint opposite the deflector top wall of the upper debris deflector, the first angled walls extending up from the cover angled wall joint and diverging away from each other toward the opposite deflector angled walls of the upper debris deflector, the first angled walls of the flame deflector thereby configured to deflect flames and heat around the burner cover.

2. The apparatus of claim 1, wherein the first angled walls of the lower flame deflector terminate at angled wall edges that transition to second angled walls that turn relative to the first angled walls so as to be substantially parallel with the deflector angled walls of the upper debris deflector.

3. The apparatus of claim 2, wherein the second angled walls are immediately adjacent and affixed to the debris deflector angled walls.

4. The apparatus of claim 1, wherein each burner comprises a burner tube and a plurality of burner holes formed within the burner tube, the burner holes being positioned at angular positions substantially corresponding to the first angled walls of the lower flame deflector, wherein flames emitted from the burner holes within the burner tube leave the burner at an angle and then are deflected away from the first angled walls of the lower flame deflector.

5. The apparatus of claim 1, further comprising a firebox basin positioned beneath the at least two spaced-apart burners, the firebox basin having at least one upwardly-extending protrusion having opposite basin angled walls linked at a basin angled wall joint, wherein a respective burner, the respective cover angled wall joint, and the basin angled wall joint are substantially vertically aligned.

6. The apparatus of claim 5, wherein:
   the firebox basin further comprises opposite basin angled side walls extending substantially upwardly from a basin bottom wall, each basin angled side wall terminating opposite the basin bottom wall in a substantially outwardly-extending side wall flange; and
   the side wall flange is vertically positioned substantially adjacent to the top wall of the upper debris deflector.

7. The apparatus of claim 5, wherein the deflector top wall is substantially horizontal and configured to seat on opposite burner cover mount tabs formed within the firebox basin.

8. The apparatus of claim 5, further comprising:
   a body having a front panel, opposite side panels connected with the front panel, and a rear panel connected with the side panels opposite the front panel, the at least two spaced-apart burners and the firebox basin being contained within the body; and
   a lid pivotally installed on the body so as to selectively open and close the body.

9. The apparatus of claim 1, further comprising at least one solid fuel tray comprising opposite tray angled side walls configured to seat on the deflector angled walls so as to selectively suspend the solid fuel tray between the at least two burner covers.

10. The apparatus of claim 9, wherein the solid fuel tray further comprises:
    a tray bottom wall positioned between and connecting the opposite tray angled side walls; and
    a plurality of slots formed in the tray bottom for allowing a solid fuel placed in the solid fuel tray to be ignited or breathe.

11. The apparatus of claim 10, wherein the solid fuel tray further comprises a perimeter flange.

12. The apparatus of claim 11, wherein the perimeter flange extends substantially laterally outwardly from at least the opposite tray angled side walls substantially opposite and parallel to the tray bottom wall.

13. The apparatus of claim 11, wherein the perimeter flange is configured for selectively seating on the deflector top walls of respective adjacent burner covers.

14. The apparatus of claim 10, wherein the width of the tray bottom wall substantially corresponds to the spacing of both the at least two spaced-apart burners and the respective at least two burner covers.

15. A grill apparatus comprising:
    at least two spaced-apart burners;
    at least two burner covers positioned over and spaced from the respective at least two spaced-apart burners, each burner cover comprising an upper debris deflector having a deflector top wall and opposite, downwardly-extending deflector angled walls configured to shed debris away from the respective burner;
    at least one solid fuel tray comprising opposite tray angled side walls configured to seat on the deflector angled walls so as to selectively suspend the solid fuel tray between the at least two burner covers; and a firebox basin positioned beneath the at least two spaced-apart burners, the firebox basin comprising opposite basin angled side walls extending substantially upwardly from a basin bottom wall, each basin angled side wall terminating opposite the basin bottom wall in a substantially outwardly-extending side wall flange the side wall flange is vertically positioned substantially adjacent to the top wall of the upper debris deflector, whereby the side wall flange and the adjacent burner cover cooperate in selectively supporting the at least one solid fuel tray.

16. A grill apparatus comprising:

at least two spaced-apart burners;

at least two burner covers positioned over and spaced from the respective at least two spaced-apart burners, each burner cover comprising an upper debris deflector having a deflector top wall and opposite, downwardly-extending deflector angled walls configured to shed debris away from the respective burner; and a firebox basin positioned beneath the at least two spaced-apart burners, wherein the deflector top wall is substantially horizontal and configured to seat on opposite burner cover mount tabs formed within the firebox basin.

17. A grill apparatus comprising:

at least two spaced-apart burners;

at least two burner covers positioned over and spaced from the respective at least two spaced-apart burners, each burner cover comprising an upper debris deflector having a deflector top wall and opposite, downwardly-extending deflector angled walls configured to shed debris away from the respective burner;

a firebox basin positioned beneath the at least two spaced-apart burners;

a body having a front panel, opposite side panels connected with the front panel, and a rear panel connected with the side panels opposite the front panel, the at least two spaced-apart burners and the firebox basin being contained within the body; and a lid pivotally installed on the body so as to selectively open and close the body.

18. The apparatus of claim 17, wherein at least one front panel vent is formed in the front panel.

19. The apparatus of claim 18, wherein at least two controls are configured on the front panel corresponding to the at least two spaced-apart burners, further wherein the at least two controls are oriented horizontally and two offset front panel vents are formed in the front panel above and below the at least two controls.

20. The apparatus of claim 17, wherein a burner mount ledge is formed in the rear panel of the body on which burner mount ledge the at least two spaced-apart burners are installed so as to span the interior space of the grill apparatus within the body above and offset from the firebox basin.

21. The apparatus of claim 17, further comprising a grate configured to be selectively suspended within the body over the at least two spaced-apart burners and the firebox basin.

* * * * *